UNITED STATES PATENT OFFICE.

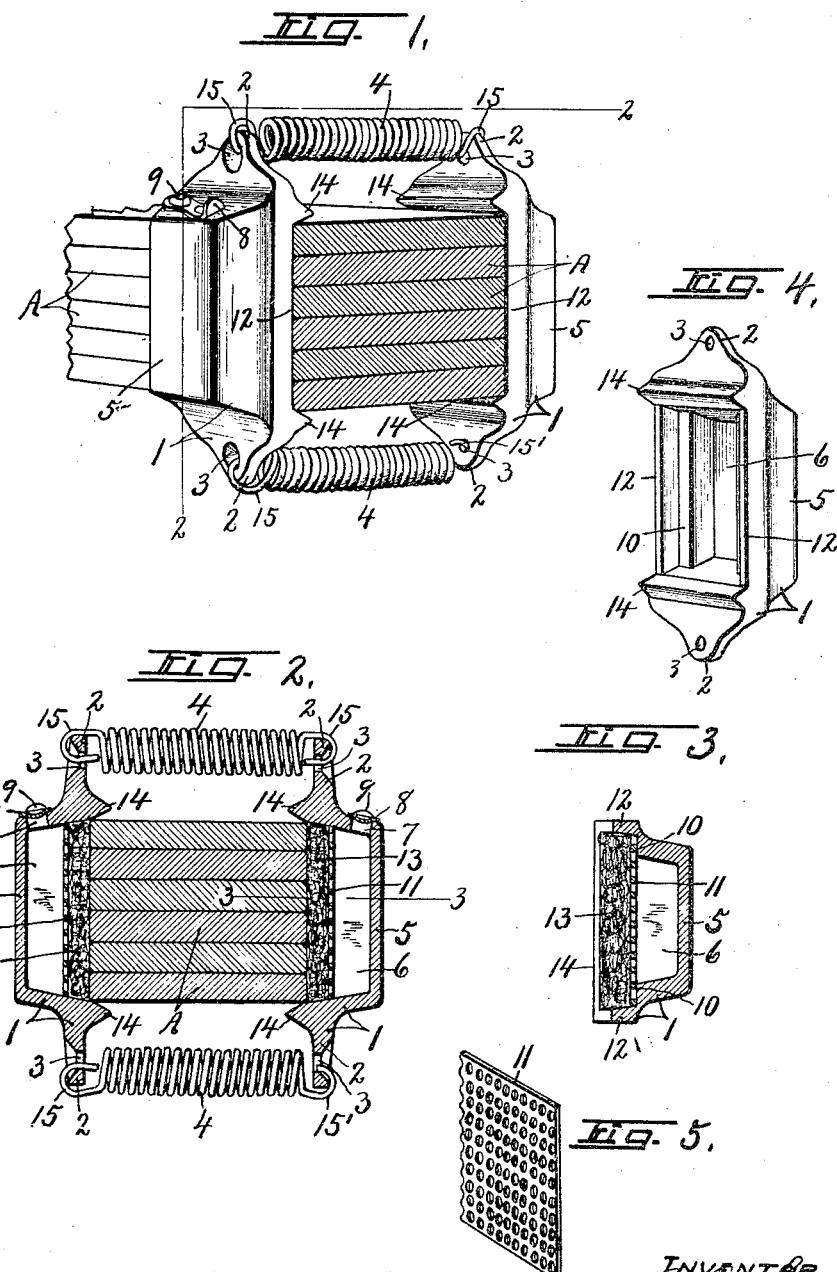

ARTHUR R. VISSCHER, OF SYRACUSE, NEW YORK.

LEAF-SPRING OILER.

1,279,795.  Specification of Letters Patent.  Patented Sept. 24, 1918.

Application filed April 15, 1918. Serial No. 228,613.

*To all whom it may concern:*

Be it known that I, ARTHUR R. VISSCHER, a citizen of the United States of America, and resident of Syracuse, in the county of Onondaga, in the State of New York, have invented new and useful Improvements in Leaf-Spring Oilers, of which the following, taken in connnection with the accompanying drawings, is a full, clear, and exact description.

This invention relates to certain improvements in leaf spring oilers adapted to be clamped to the edges of leaf springs for lubricating the contiguous faces thereof to enable them to play freely one upon the other as the spring is compressed and distended.

I am aware that many devices for this purpose have heretofore been proposed in which opposed plates are clamped by bolts or similar rigid connections to opposite edges of the springs, one or both plates being provided with oil or grease reservoirs for supplying the lubricant to the contiguous faces of the leaves.

I find, however, that the use of bolts for connecting these plates are objectionable for two reasons:—

First,—that they require considerable time to install and remove the plates, and Second,—that there is always more or less liability of the bolts becoming loosened and the plates becoming displaced or lost.

Another object is that when the clips or plates are first applied to the springs and tightened by means of bolts, it is frequently necessary to take up the bolts as the absorbent pad or pads become worn or seated against the edges of the springs, and one of the objects of my invention is to connect the plates by coil springs above and below the leaf springs so as to afford an automatic takeup for the wear or compression of the absorbent pads.

A further object is to permanently hinge the ends of one spring to the corresponding edges of the plates and to permanently hinge one end of the other spring to the corresponding end of the other plate and to provide the other end of the last-named spring with a hook by which it may be readily attached to and detached from the corresponding edge of the adjacent plate so that the plates with their lubricating pads therein, together with the springs, are alwaye assembled ready for use and may be readily folded back to back or unfolded lengthwise into compact space for storage and transportation when not in use without detaching the various parts, except at the one point of connection of the hook.

Another object is to provide each plate with a yielding perforated backing for the absorbent pad to serve as a foraminous partition between said pad and the lubricant-containing reservoir for distributing the lubricant more evenly over the surface of the pad, and at the same time affording greater resiliency of pressure of the pad upon the edges of the leaves of the spring so that when the plates are clamped in place upon the leaf spring, the tension of the clamping springs automatically compresses the absorbent pads against the edges of the leaves, which in turn places the partitions under slight tension, the latter in turn serving to additionally compress the pads to expel the lubricant therefrom between the leaves of the spring after the device has been installed.

Other objects and uses relating to specific parts of the oiling device will be brought out in the following description.

In the drawings—

Figure 1 is a perspective view of a portion of a leaf spring and my improved oiling device mounted thereon.

Fig. 2 is a transverse sectional view taken on line 2—2, Fig. 1.

Fig. 3 is a detail sectional view taken in the plane of line 3—3, Fig. 2.

Fig. 4 is a perspective view of one of the detached lubricating plates or clips, omitting the lubricating pad and perforated partition.

Fig. 5 is a perspective view of the detached perforated partition.

As illustrated, this oiling device comprises a pair of similar and interchangeable or reversible lubricating plates or clips —1— of cast metal or equivalent material, each of substantially rectangular form in face view, except that its lower and upper edges are provided with integral lugs —2— having apertures —3— for the reception of the ends of the clamping springs —4—, the lugs —2— of each plate being disposed in substantially the same vertical plane near the inner face of the plate.

The central portion of each plate or clip is provided with a hollow outwardly bulging rectangular portion —5— forming a chamber or reservoir —6— for receiving and retaining a lubricant, such as oil or grease, each chamber having an inlet —7— in the upper wall thereof to permit the insertion of the lubricant, said inlet being normally closed by a valve or cap —8— which is pivoted at —9— to permit it to be moved to and from its closed position, and shown more clearly in Fig. 2, the portion of the valve alined with the inlet —7— being slightly depressed to frictionally hold it in its closed position when registered with said inlet.

The inner face of the plate is somewhat wider than and extends beyond the opposite upright walls of the reservoir —6— to form substantially flat upright ledges or seats —10— for receiving and supporting the edges of a substantially rectangular perforated plate or partition —11—, said plate being also provided with opposite upright parallel flanges —12— projecting inwardly along the outer edges of the seats or ledges —10— to additionally hold the partition —11— in operative position against lateral movement, and also to assist in retaining an absorbent pad —13— which rests against the inner face of the perforated partition —11—.

The portions of each plate above and below the reservoir —6— and ledges —10— are provided with inwardly projecting beveled flanges —14— parallel with each other and projecting beyond the inner edges of the flanges —12— for engaging, respectively, the upper face of the adjacent edge of the upper leaf of the spring, as —A—, and the lower face of the adjacent edge of the lower leaf of the same spring, the object in beveling the flanges —14— being to permit the plates to more readily register with the adjacent edges of the springs when adjusting them for use, and also to hold the plates against vertical movement relatively to the leaf spring.

The ends of one of the clamping springs —4— constitute closed loops —15— passing through the adjacent apertured lugs —2— for permanently hinging the plates to the adjacent ends of said clamping spring.

In like manner, one end of the opposite clamping spring —4— is provided with a closed loop —15— passing through the adjacent apertured lug —2— for permanently hinging it thereto, the opposite end of said clamping spring being provided with a hook or open loop —15'— engaging in the adjacent apertured lug —2— so that it may be readily detached therefrom when necessary in placing the oiling device upon or removing it from the leaf spring.

It will thus be seen that the plates and clamping springs are all permanently, but flexibly, connected to each other so that they may be extended in a straight line or flat plane or folded into compact space for convenience in storage or transportation.

The inner faces of the flanges —12— and lower and upper walls of the plate —1— above and below the seats —10— are slightly beveled inwardly to permit the perforated partition —11— and pad —12— to be tightly wedged therebetween so as to render said partition and pad practically self-retaining in the plate, but in order to further retain these parts in operative position, the edges of the pad are preferably cemented by shellac or other cementitious substance to the beveled walls mentioned.

The pads —13— are substantially flat and rectangular and are of sufficient thickness to project inwardly some distance beyond the inner edges of the flanges —12— when seated against the inner face of the perforated partition —11— so as to assure their direct contact with the adjacent edges of the leaves of the spring —A—, as shown more clearly in Fig. 2.

In order to remove the lubricating device from the leaf spring, it is simply necessary to detach the hook —15'— from its adjacent lug —2— and to allow its clamping spring —4— to swing downwardly, whereupon the opposite plates —1— may be swung upwardly by hand upon the pivotal loops —15— of the upper spring until the device is entirely disengaged from the leaf spring, whereupon said device may be readily lifted from said leaf spring.

In replacing the lubricating device, the opposite plates are positioned from the top downwardly at opposite sides of the leaf spring until the upper shoulders —14— rest upon the uppermost leaf, whereupon the lower ends of the plates may be drawn toward each other and the hook —15'— reattached to its corresponding lug —2—, the device being then ready for use after a suitable quantity of oil has been placed in the reservoir —6— and the caps or valves —8— closed.

It will be noted that in this construction of leaf spring lubricator, the pads are pressed under the yielding tension of the clamping springs —4— against the adjacent edges of the leaves of the spring —A— and that the clamping springs serve to take up any wear or undue looseness of the pads, and that this compression produces more or less tension upon the central portions of the yielding partitions —11— which are preferably made of light spring steel and react upon the pads to produce additional compression thereof to expel the lubricant therefrom more uniformly between the leaves of the vehicle spring —A—, the perforations in the partitions —11— serving to distribute the lubricant more evenly over the entire surface of the pad, and also to prevent excessive feed of the lubricant to said pad and vehicle spring.

What I claim is:

1. A leaf spring lubricator comprising a pair of similar and interchangeable plates adapted to be positioned at opposite edges of the vehicle spring and provided with lubricant-containing reservoirs opening through the inner faces thereof, perforated partitions across the inner sides of the reservoir, absorbent pads resting against the inner faces of the partitions and adapted to engage the edges of the vehicle spring, and clamping springs connecting the upper and lower edges of said plates above and below the vehicle spring when the device is adjusted for use.

2. A lubricating device for leaf springs comprising opposed, but similar and interchangeable plates having outwardly bulged substantially rectangular central portions provided with lubricant-containing chambers, said plates having upright ledges at opposite sides of their respective chambers, perforated partitions seated against said ledges, absorbent pads seated against the inner faces of said partitions, and clamping springs connecting the lower and upper edges of the plates above and below the leaf spring when the device is adjusted for use.

3. In combination with a leaf spring, opposed, but similar and interchangeable, plates at opposite edges of the leaf spring having inwardly projecting flanges overhanging the adjacent edges of the lower and upper leaves of said leaf spring when adjusted for use, said plates being provided with lubricant-containing reservoirs, absorbent pads across said reservoirs and adjacent the edges of the leaf spring, coiled clamping springs connecting the lower and upper edges of the plates and tensioned to draw said plates toward each other to hold the pads in contact with the edges of the leaf spring, and perforated partitions within said plates and against the upper faces of the pad.

4. In combination with a leaf spring, opposed, but similar and interchangeable, plates at opposite edges of the leaf spring having lubricant-containing reservoirs registering with said edges, yielding perforated plates across the open sides of said reservoirs, absorbent pads between said partitions and edges of the leaf spring, and coil springs connecting the lower and upper edges of said plates above and below the leaf spring.

5. In combination with a leaf spring, opposed, but similar and interchangeable, plates at opposite edges of the leaf spring having lubricant-containing reservoirs registering with said edges, yielding perforated plates across the open sides of said reservoirs, absorbent pads between said partitions and edges of the leaf spring, and coil springs connecting the lower and upper edges of said plates above and below the leaf spring, one end of one of the coil springs constituting a hook for detachably interlocking engagement with the adjacent edge of one of the plates, the remaining ends of the coil springs being permanently hinged to the corresponding plates.

In witness whereof I have hereunto set my hand this 5th day of April, 1918.

ARTHUR R. VISSCHER.

Witnesses:
H. E. CHASE,
ALICE M. CANNON.